US010013063B2

(12) United States Patent
Levesque et al.

(10) Patent No.: US 10,013,063 B2
(45) Date of Patent: *Jul. 3, 2018

(54) SYSTEMS AND METHODS FOR DETERMINING HAPTIC EFFECTS FOR MULTI-TOUCH INPUT

(71) Applicant: Immersion Corporation, San Jose, CA (US)

(72) Inventors: Vincent Levesque, Montreal (CA); Juan Manuel Cruz-Hernandez, Montreal (CA)

(73) Assignee: Immersion Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/620,174

(22) Filed: Jun. 12, 2017

(65) Prior Publication Data

US 2017/0277263 A1   Sep. 28, 2017

Related U.S. Application Data

(63) Continuation of application No. 14/336,548, filed on Jul. 21, 2014, now Pat. No. 9,710,063.

(51) Int. Cl.
*G06F 3/044* (2006.01)
*G06F 3/01* (2006.01)
*G06F 3/0488* (2013.01)

(52) U.S. Cl.
CPC ............. *G06F 3/016* (2013.01); *G06F 3/044* (2013.01); *G06F 3/04883* (2013.01); *G06F 2203/04808* (2013.01)

(58) Field of Classification Search
CPC ....................................................... G06F 3/041
See application file for complete search history.

(56) References Cited

U.S. PATENT DOCUMENTS 8,098,235 B2    1/2012   Heubel et al.
2005/0231489 A1*  10/2005  Ladouceur ............ G06F 1/1626
                                                         345/184

(Continued)

OTHER PUBLICATIONS

European Patent Office Application No. 15177404.9, Extended European Search Report dated Nov. 17, 2015.

(Continued)

*Primary Examiner* — Vijay Shankar
*Assistant Examiner* — Cory Almeida
(74) *Attorney, Agent, or Firm* — Kilpatrick Townsend & Stockton LLP

(57) ABSTRACT

A system of the present disclosure may include a haptic output device configured to output a haptic effect to a touch surface; a touch sensitive input device configured to detect a first user interaction and transmit a first sensor signal, the touch sensitive input device further configured to detect a second user interaction and transmit a second sensor signal, wherein at least part of the first user interaction occurs at the same time as the second user interaction; a processor in communication with the sensor, the processor configured to: receive the first sensor signal and the second sensor signal; determine a haptic effect based in part on the first user interaction and the second user interaction; transmit a haptic signal associated with the haptic effect to the haptic output device.

20 Claims, 7 Drawing Sheets

(56) References Cited

U.S. PATENT DOCUMENTS

| | | |
|---|---|---|
| 2010/0156818 A1 | 6/2010 | Burrough et al. |
| 2011/0191674 A1* | 8/2011 | Rawley .................. G06F 3/016 |
| | | 715/702 |
| 2012/0223880 A1 | 9/2012 | Birnbaum et al. |
| 2012/0229401 A1* | 9/2012 | Birnbaum ............... G06F 3/016 |
| | | 345/173 |
| 2012/0268412 A1 | 10/2012 | Cruz-Hernandez et al. |
| 2013/0057509 A1 | 3/2013 | Cruz-Hernandez et al. |
| 2014/0092032 A1* | 4/2014 | Moore .................... G06F 3/167 |
| | | 345/173 |
| 2014/0118127 A1 | 5/2014 | Levesque et al. |

OTHER PUBLICATIONS

Disney Research—Science at Play, Electrostatic Vibration, web page at http://www.disneyresearch.com/project/teslatouch/, as available via the internet and printed Mar. 11, 2015.
European Patent Office Application No. 15177404.9, Office Action dated Jan. 18, 2018, 3 pages.

\* cited by examiner

SYSTEMS AND METHODS FOR DETERMINING HAPTIC EFFECTS FOR MULTI-TOUCH INPUT

CROSS REFERENCE TO RELATED APPLICATIONS

This application claims priority to and is a continuation of U.S. application Ser. No. 14/336,548, filed on Jul. 21, 2014, and entitled "Systems And Methods For Determining Haptic Effects For Multi-Touch Input," the entirety of which is hereby incorporated herein by reference.

FIELD OF THE INVENTION

The present invention relates to the field of user interface devices and haptic effects. More specifically, the present invention relates to determining a haptic effect associated with a multi-touch input.

BACKGROUND

Touch enabled devices have become increasingly popular. For instance, mobile and other devices may be configured with touch-sensitive displays so that a user can provide input by touching portions of the touch-sensitive display. As another example, a touch enabled surface separate from a display may be used for input, such as a trackpad, mouse, or other device. Further, many of these touch enabled devices allow for multi-touch. Some touch enabled devices make use of haptic effects, for example, haptic effects associated with user interaction. There is a need to determine haptic effects associated with multi-touch input.

SUMMARY

Embodiments of the present disclosure include devices configured to output haptic effects based on user interaction with a touch area. These haptic effects may simulate one or more features in a touch area. Features may comprise, for example, changes in texture, coefficient of friction, and/or simulation of boundaries, obstacles, or other discontinuities in the touch surface that can be perceived through user interaction with the device. In some embodiments, these haptic effects may comprise surface based effects that are perceived through contact with a touch surface. These haptic effects may further comprise vibrations that are felt through contact with the touch surface or housing of the device. Embodiments of the present disclosure determine these haptic effects based in part on multi-touch user interaction.

In one embodiment, a system of the present disclosure may comprise: a haptic output device configured to output a haptic effect to a touch surface; a touch sensitive input device configured to detect a first user interaction and transmit a first sensor signal, the touch sensitive input device further configured to detect a second user interaction and transmit a second sensor signal, wherein at least part of the first user interaction occurs at the same time as the second user interaction; a processor in communication with the sensor, the processor configured to: receive the first sensor signal and the second sensor signal, determine a haptic effect based in part on the first user interaction and the second user interaction; transmit a haptic signal associated with the haptic effect to the haptic output device.

This illustrative embodiment is mentioned not to limit or define the limits of the present subject matter, but to provide an example to aid understanding thereof. Illustrative embodiments are discussed in the Detailed Description, and further description is provided there. Advantages offered by various embodiments may be further understood by examining this specification and/or by practicing one or more embodiments of the claimed subject matter.

BRIEF DESCRIPTION OF THE DRAWINGS

A full and enabling disclosure is set forth more particularly in the remainder of the specification. The specification makes reference to the following appended figures.

DETAILED DESCRIPTION

Figure 1A:
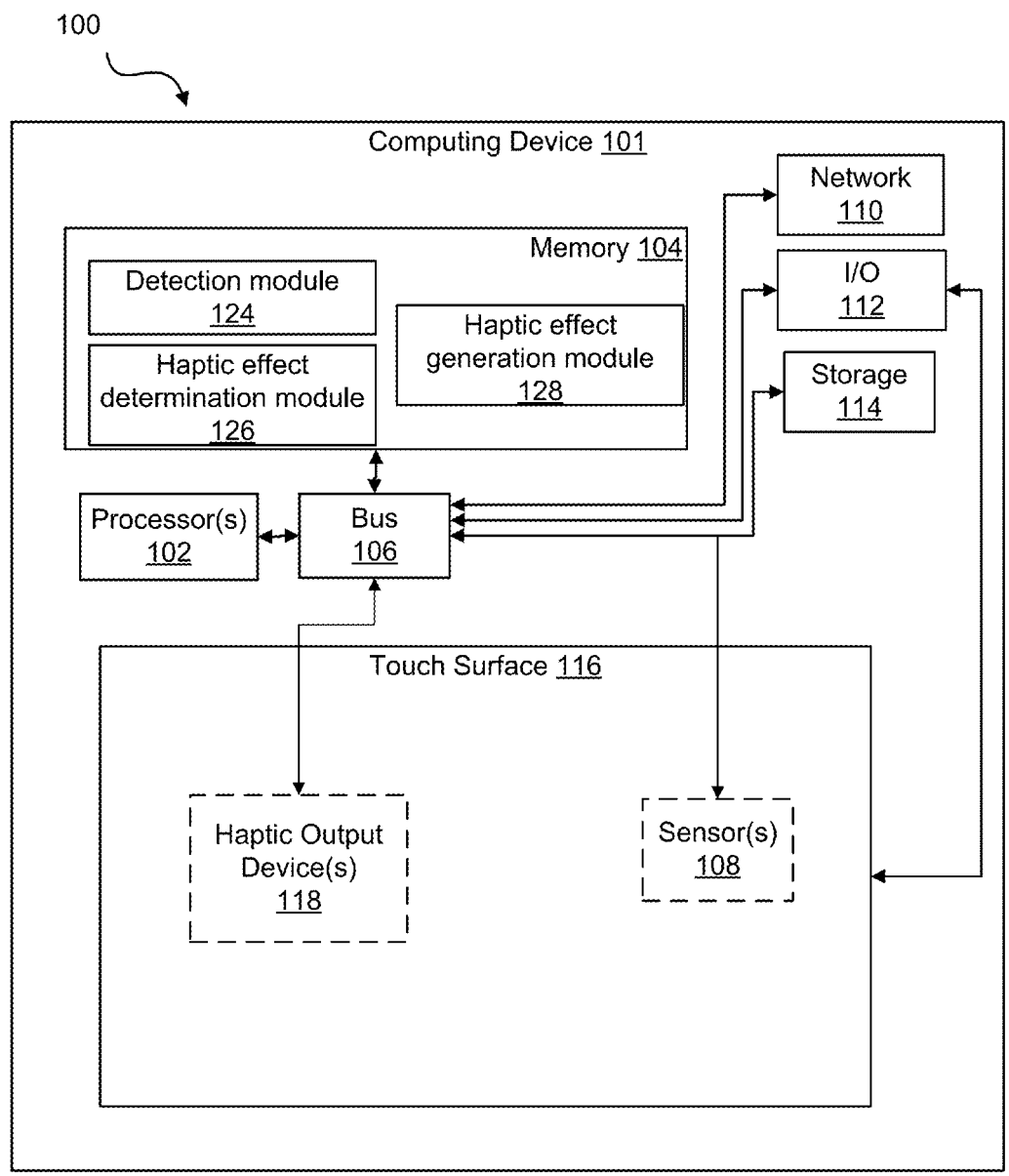
FIG. 1A shows an illustrative system for determining haptic effects for multi-touch input.

Reference will now be made in detail to various and alternative illustrative embodiments and to the accompanying drawings. Each example is provided by way of explanation, and not as a limitation. It will be apparent to those skilled in the art that modifications and variations can be made. For instance, features illustrated or described as part of one embodiment may be used in another embodiment to yield a still further embodiment. Thus, it is intended that this disclosure include modifications and variations as come within the scope of the appended claims and their equivalents.

Illustrative Example of Determining Haptic Effects for Multi-Touch Input

One illustrative embodiment of the present disclosure comprises a computing system such as a smartphone, tablet, or portable music device. The computing system can include and/or may be in communication with one or more sensors, such as an accelerometer, as well as sensors (e.g., optical, resistive, or capacitive) for determining a location of a touch relative to a display area corresponding in this example to the screen of the device.

In the illustrative device the sensors can detect multi-touch. For example, the multi-touch may comprise a user gesture of more than one finger, e.g., a two figure pinch or more complex user interaction such as interaction involving two hands. For example, the illustrative device may comprise a touch-screen display configured to detect multi-touch interaction.

The illustrative device is further configured to output haptic effects in response to user interaction. For example, the illustrative device may comprise one or more haptic output devices such as actuators and/or devices configured to output haptic effects. For example, a haptic effect may be configured to change the coefficient of friction perceived by the user when moving his or her finger across the surface of the device. In one such embodiment, as the user's finger moves across the surface, a vibration, electric field, or other effect may be output to change the coefficient of friction felt by the user. Depending on how the friction is varied, the user may perceive a feature in the touch surface that would not otherwise be perceived in the same manner (or at all) if the surface friction were not varied. As a particular example, the friction may be varied so that the user perceives a bump, border, or other obstacle corresponding to an edge of a feature, for example, an on-screen widget such as a virtual button, slider, knob, or other interface. In some embodiments, this widget may be configured to control a system associated with the widget. For example, in one embodiment, the widget may comprise a virtual knob configured to control an HVAC system. Thus, by interacting with the virtual knob, a user may be able to adjust settings of the HVAC system.

The processor of the illustrative device is configured to determine haptic effects based on multi-touch interaction. Thus, in some embodiments, the processor determines the haptic effect based in part on the multiple user contacts with the device, e.g., multiple contacts with a touchscreen display. For example, in the illustrative device, if the touchscreen detects a two-finger swipe, the processor may determine a haptic effect based in part on both points of contact. Further, in the illustrative device, if the touchscreen detects a more complex interaction involving many points of contact, the processor may determine a haptic effect based in part on each of the points of contact. Further, in some embodiments the device may comprise multiple different haptic output devices (e.g., a vibrating actuator and an ESF actuator). In such an embodiment, the processor may be configured to determine which of the haptic output devices to use to output the haptic effect. For example, the processor may determine that the haptic effect should be output by multiple haptic output devices.

In some embodiments, the processor may determine the effect based on multiple factors associated with the multi-touch. For example, in some embodiments the multi-touch may be associated with features in a graphical user interface (e.g., buttons, keys, or graphical widgets in the user interface). In such an embodiment, the processor may determine the haptic effect based in part on these features. For example, in one embodiment, a finger may touch one virtual feature (e.g., a button) while the other finger touches another virtual feature (e.g., a slider). In such an embodiment, the processor may determine the haptic effect based in part on these features. For example, the processor may determine that the button overrides the slider and thus output a haptic effect associated with the button.

Alternatively, the processor may determine that a specific haptic effect has a higher priority than another haptic effect, and thus output only the high priority effect. For example, the processor may determine that a haptic effect configured to simulate the edge of an object in the graphical user interface has a higher priority than other effects, and thus output only the edge effect. Alternatively, the processor may determine that only the most intense effect should be output. Thus, in some embodiments, the processor may determine a low intensity vibration and a high intensity vibration, but output only the high intensity vibration. Further, in some embodiments, the processor may determine which component of the multitouch is most likely to feel the effect, e.g., which of the user's fingers is most likely to feel the effect. In such an embodiment, the processor may output the haptic effect associated with that interaction of that finger.

Further, in some embodiments, the processor may determine the haptic effect based on information associated with the multi-touch. For example, the processor may determine the haptic effect based on the user interaction that occurred first. In some embodiments, the processor may determine the haptic effect based on the most active user interaction (the interaction with the most movement), least active user interaction, or the user interaction applying the most pressure.

In some embodiments, the processor may determine a haptic effect associated with each user interaction associated with the multi-touch, but output only one haptic effect. So, for example, the processor may determine an average of the haptic effects and output that average. Further, in some embodiments, the processor may determine which of the haptic effects is the most intense or has the highest priority. Further, in some embodiments, the processor may determine a superposition of the user interactions associated with the multi-touch. For example, the processor may determine a haptic effect associated with each of the points of contact. The processor may then apply a weighting to each of these haptic effects and combine them to determine a haptic effect to output.

In still other embodiments, the user may assign a preference for how the haptic effect should be determined, e.g., assign a specific effect or assign a specific way of determining the haptic effect. In still other embodiments, the processor may determine to output no haptic effects. For example, the processor may determine that the haptic effect would be confusing or misleading to the user.

In another embodiment, the processor may determine that the user interaction is associated with two different users (e.g., a first user and a second user). In such an embodiment the processor may determine a haptic effect associated with just one of the user interactions (e.g., an effect associated with only the first user). In another embodiment, the processor may determine a haptic effect associated with both user interactions (e.g., a haptic effect associated with the interactions of both the first user and the second user). In still another embodiment, the processor may determine that no haptic effect should be output.

As will be discussed in further detail below, haptic effects associated with a multi-touch may be determined in any number of ways. Further, as discussed below, these methods may be used to provide many different types of information to the user.

Illustrative Systems for Determining Haptic Effects for Multi-Touch Input

FIG. 1A shows an illustrative system 100 for determining haptic effects for multi-touch input. In this example, system 100 comprises a computing device 101 having a processor 102 interfaced with other hardware via bus 106. A memory 104, which can comprise any suitable tangible (and non-transitory) computer-readable medium such as RAM, ROM, EEPROM, or the like, embodies program components that configure operation of the computing device. In this example, computing device 101 further includes one or more network interface devices 110, input/output (I/O) interface components 112, and additional storage 114.

Network device 110 can represent one or more of any components that facilitate a network connection. Examples include, but are not limited to, wired interfaces such as Ethernet, USB, IEEE 1394, and/or wireless interfaces such as IEEE 802.11, Bluetooth, or radio interfaces for accessing cellular telephone networks (e.g., transceiver/antenna for accessing a CDMA, GSM, UMTS, or other mobile communications networks).

I/O components 112 may be used to facilitate connection to devices such as one or more displays, keyboards, mice, speakers, microphones, and/or other hardware used to input data or output data. Storage 114 represents nonvolatile storage such as magnetic, optical, or other storage media included in device 101.

System 100 further includes a touch surface 116, which, in this example, is integrated into device 101. Touch surface 116 represents any surface that is configured to sense tactile input of a user. One or more sensors 108 are configured to detect a touch in a touch area when one or more objects (e.g., body parts such as fingers or hands or components such as a stylus or brush) contact a touch surface and provide appropriate data for use by processor 102. One or more sensors 108 may be configured to sense a single touch or a multitouch and the pressure of a single touch or a multitouch (including the pressure of each touch within the multitouch). Any suitable number, type, or arrangement of sensors can be used. For example, resistive and/or capacitive sensors may be embedded in touch surface 116 and used to determine the location of a touch and other information, such as pressure. In some embodiments, pressure sensors may be used to detect multitouch location or pressure. As another example, optical sensors with a view of the touch surface may be used to determine the touch position. In some embodiments, one or more sensors 108 may be configured to detect a multi-touch associated with multiple locations on a device. For example, one or more sensors 108 may be configured to detect a touch on a touch surface as well as a touch on a housing of a device. Further, one or more sensors 108 may be configured to detect the pressure associated with each of these touches.

In some embodiments, sensor 108 and touch surface 116 may comprise a touch-screen or a touch-pad. For example, in some embodiments, touch surface 116 and sensor 108 may comprise a touch-screen mounted overtop of a display configured to receive a display signal and output an image to the user. In other embodiments, the sensor 108 may comprise an LED detector. For example, in one embodiment, touch surface 116 may comprise an LED finger detector mounted on the side of a display. In some embodiments, the processor is in communication with a single sensor 108, in other embodiments, the processor is in communication with a plurality of sensors 108, for example, a first touch-screen and a second touch screen. The sensor 108 is configured to detect user interaction, and based on the user interaction, transmit signals to processor 102. In some embodiments, sensor 108 may be configured to detect multiple aspects of the user interaction. For example, sensor 108 may detect the speed and pressure of a user interaction, and incorporate this information into the interface signal.

In this example, a haptic output device 118 in communication with processor 102 is coupled to touch surface 116. In some embodiments, haptic output device 118 is configured to output a haptic effect simulating a texture on the touch surface in response to a haptic signal. Additionally or alternatively, haptic output device 118 may provide vibrotactile haptic effects that move the touch surface in a controlled manner. Some haptic effects may utilize an actuator coupled to a housing of the device, and some haptic effects may use multiple actuators in sequence and/or in concert. For example, in some embodiments, a surface texture may be simulated or the perceived coefficient of friction may be varied (e.g., reduced or increased) by vibrating the surface at different frequencies. In such an embodiment, haptic output device 118 may comprise one or more of, for example, a piezoelectric actuator, an electric motor, an electromagnetic actuator, a voice coil, a shape memory alloy, an electro-active polymer, a solenoid, an eccentric rotating mass motor (ERM), or a linear resonant actuator (LRA). In some embodiments, haptic output device 118 may comprise a plurality of actuators, for example, an ERM and an LRA.

Although a single haptic output device 118 is shown here, embodiments may use multiple haptic output devices of the same or different type to output different types of effects or combinations of effects, for example, vibrations, pops, clicks, surface deformations, and/or surface based effects such as variations in the coefficient of friction or simulated surface textures. For example, in one embodiment, a piezoelectric actuator may be used to displace some or all of touch surface 116 vertically and/or horizontally at ultrasonic frequencies, such as by using an actuator moving at frequencies greater than 20 kHz. In some embodiments, multiple actuators such as eccentric rotating mass motors and linear resonant actuators can be used alone or in concert to provide vibrations or other haptic effects.

In still other embodiments, haptic output device 118 may use electrostatic attraction, for example by use of an electrostatic surface actuator, to simulate a texture on the surface of touch surface 116 or to vary the coefficient of friction the user feels when moving his or her finger across touch surface 116. For example, in one embodiment, haptic output device 118 may comprise an electrovibrotactile display or any other device that applies voltages and currents instead of mechanical motion to generate a haptic effect. In such an embodiment, the electrostatic actuator may comprise a conducting layer and an insulating layer. In such an embodiment, the conducting layer may be any semiconductor or other conductive material, such as copper, aluminum, gold, or silver. And the insulating layer may be glass, plastic, polymer, or any other insulating material. Furthermore, the processor 102 may operate the electrostatic actuator by applying an electric signal to the conducting layer. The electric signal may be an AC signal that, in some embodiments, capacitively couples the conducting layer with an object near or touching touch surface 116. In some embodiments, the AC signal may be generated by a high-voltage amplifier.

In other embodiments the capacitive coupling may simulate a friction coefficient or texture on the surface of the touch surface 116. For example, in one embodiment, the surface of touch surface 116 may be smooth, but the capacitive coupling may produce an attractive force between an object near the surface of touch surface 116. In some embodiments, varying the levels of attraction between the object and the conducting layer can vary the simulated texture on an object moving across the surface of touch surface 116. Furthermore, in some embodiments, an electrostatic actuator may be used in conjunction with traditional actuators to vary the simulated texture on the surface of touch surface 116 or output other effects. For example, the actuators may vibrate to simulate a change in the texture of the surface of touch surface 116, while at the same time; an electrostatic actuator may simulate a different texture on the surface of touch surface 116.

One of ordinary skill in the art will recognize that, in addition to varying the coefficient of friction, other techniques or methods can be used to simulate a texture on a surface. For example, in some embodiments, a texture may be simulated or output using a flexible surface layer configured to vary its texture based upon contact from a surface reconfigurable haptic substrate (including, but not limited to, e.g., fibers, nanotubes, electroactive polymers, piezoelectric elements, or shape memory allows) or a magnetorheological fluid. In another embodiment, surface texture may be varied by raising or lowering one or more surface features, for example, with a deforming mechanism, air or fluid pockets, local deformation of materials, resonant mechanical elements, piezoelectric materials, micro-electromechanical systems ("MEMS") elements, thermal fluid pockets, MEMS pumps, variable porosity membranes, or laminar flow modulation.

In some embodiments, an electrostatic actuator may be used to generate a haptic effect by stimulating parts of the body or objects near or touching touch surface 116. For example, in some embodiments, an electrostatic actuator may stimulate the nerve endings in the skin of a user's finger or components in a stylus that can respond to the electrostatic actuator. The nerve endings in the skin, for example, may be stimulated and sense the electrostatic actuator (e.g., the capacitive coupling) as a vibration or some more specific sensation. For example, in one embodiment, a conducting layer of an electrostatic actuator may receive an AC voltage signal that couples with conductive parts of a user's finger. As the user touches the touch surface 116 and moves his or her finger on the touch surface, the user may sense a texture of prickliness, graininess, bumpiness, roughness, stickiness, or some other texture.

Turning to memory 104, illustrative program components 124, 126, and 128 are depicted to illustrate how a device can be configured in some embodiments to determine haptic effects for multi-touch input. In this example, a detection module 124 configures processor 102 to monitor touch surface 116 via sensor 108 to determine a position of one or more touches. For example, module 124 may sample sensor 108 in order to track the presence or absence of a touch (or touches) and, if a touch is present, to track one or more of the location, path, velocity, acceleration, pressure and/or other characteristics of the touch (or touches) over time.

Haptic effect determination module 126 represents a program component that analyzes data regarding touch characteristics to select a haptic effect to generate. Particularly, module 126 may comprise code that determines a haptic effect to output. As discussed in further detail below, this determination may be made based in part on a multi-touch and characteristics associated with the multi-touch, such as the location of contact, number of contacts, time of contact, pressure of contact, activity of contact, or features associated with haptic effects, e.g., priority of effect, intensity of effect, or combinations of various determined haptic effects (e.g., the average or superposition of the effect). For example, some or all of the area of touch surface 116 may be mapped to a graphical user interface. Different haptic effects may be selected based on the location of each touch in order to simulate the presence of a feature by simulating a texture on a surface of touch surface 116 so that the feature is felt when a corresponding representation of the feature is seen in the interface. However, haptic effects may be provided via touch surface 116 even if a corresponding element is not displayed in the interface (e.g., a haptic effect may be provided if a boundary in the interface is crossed, even if the boundary is not displayed).

Haptic effect generation module 128 represents programming that causes processor 102 to generate and transmit a haptic signal to actuator 118 to generate the selected haptic effect. For example, generation module 128 may access stored waveforms or commands to send to haptic output device 118. As another example, haptic effect generation module 128 may receive a desired type of texture and utilize signal processing algorithms to generate an appropriate signal to send to haptic output device 118. As a further example, a desired texture may be indicated along with target coordinates for the texture and an appropriate waveform sent to one or more actuators to generate appropriate displacement of the surface (and/or other device components) to provide the texture. Some embodiments may utilize multiple haptic output devices in concert to simulate a feature. For instance, a variation in texture may be used to simulate crossing a boundary between a button on an interface while a vibrotactile effect simulates the response when the button is pressed.

Figure 1B:
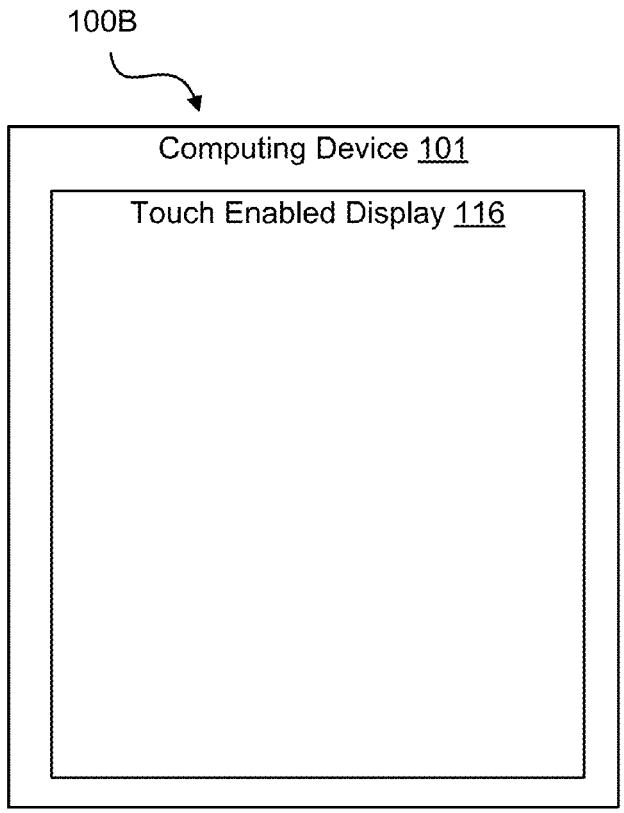
FIG. 1B shows an external view of one embodiment of the system shown in FIG. 1A.

A touch surface may or may not overlay (or otherwise correspond to) a display, depending on the particular configuration of a computing system. In FIG. 1B, an external view of a computing system 100B is shown. Computing device 101 includes a touch enabled display 116 that combines a touch surface and a display of the device. The touch surface may correspond to the display exterior or one or more layers of material above the actual display components.

Figure 1C:
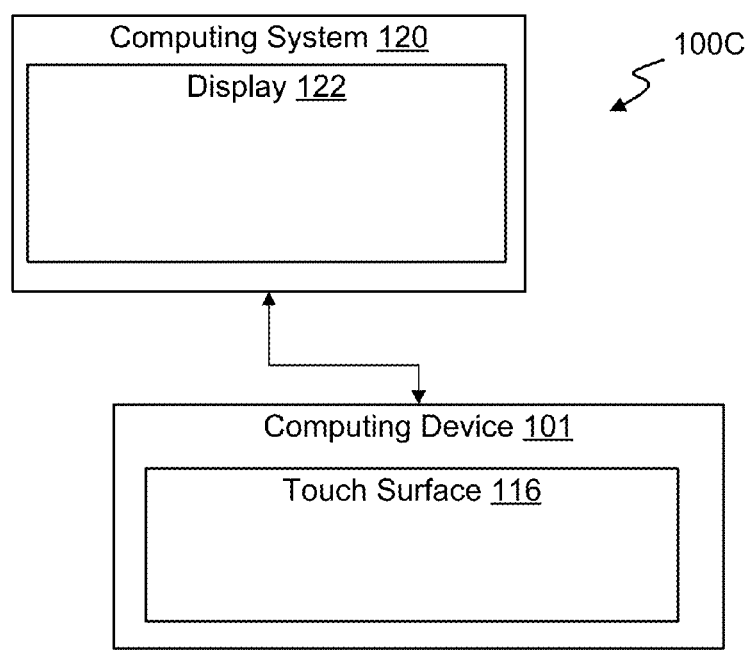
FIG. 1C illustrates an external view of another embodiment of the system shown in FIG. 1A.

FIG. 1C illustrates another example of a touch enabled computing system 100C in which the touch surface does not overlay a display. In this example, a computing device 101 comprises a touch surface 116 which may be mapped to a graphical user interface provided in a display 122 that is included in computing system 120 interfaced to device 101. For example, computing device 101 may comprise a mouse, trackpad, or other device, while computing system 120 may comprise a desktop or laptop computer, set-top box (e.g., DVD player, DVR, cable television box), or another computing system. As another example, touch surface 116 and display 122 may be disposed in the same device, such as a touch enabled trackpad in a laptop computer comprising display 122. Whether integrated with a display or otherwise, the depiction of planar touch surfaces in the examples herein is not meant to be limiting. Other embodiments include curved or irregular touch enabled surfaces that are further configured to provide surface-based haptic effects.

Figure 2A:
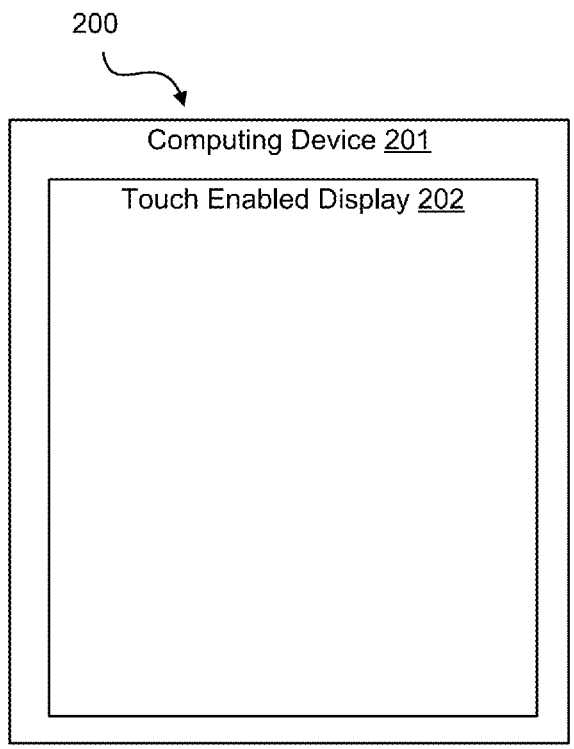
FIG. 2A illustrates another example embodiment for determining haptic effects for multi-touch input.
Figure 2B:
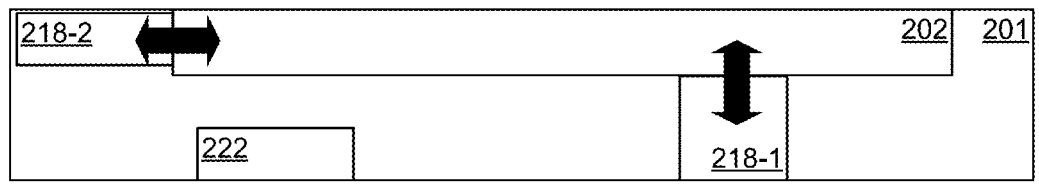
FIG. 2B illustrates another example embodiment for determining haptic effects for multi-touch input.

FIGS. 2A-2B illustrate an example embodiment of systems and methods for determining haptic effects for multi-touch input. FIG. 2A is a diagram illustrating an external view of a system 200 comprising a computing device 201 that comprises a touch enabled display 202. FIG. 2B shows a cross-sectional view of device 201. Device 201 may be configured similarly to device 101 of FIG. 1A, though components such as the processor, memory, sensors, and the like are not shown in this view for purposes of clarity.

As can be seen in FIG. 2B, device 201 comprises a plurality of haptic output devices 218 and an additional haptic output device 222. Haptic output device 218-1 may comprise an actuator configured to impart vertical force to display 202, while 218-2 may move display 202 laterally. In this example, the haptic output devices 218, 222 are coupled directly to the display, but it should be understood that the haptic output devices 218, 222 could be coupled to another touch surface, such as a layer of material on top of display 202. Furthermore it should be understood that one or more of haptic output devices 218 or 222 may comprise an electrostatic actuator, as discussed above. Furthermore, haptic output device 222 may be coupled to a housing containing the components of device 201. In the examples of FIGS. 2A-2B, the area of display 202 corresponds to the touch area, though the principles could be applied to a touch surface completely separate from the display.

In one embodiment, haptic output devices 218 each comprise a piezoelectric actuator, while additional haptic output device 222 comprises an eccentric rotating mass motor, a linear resonant actuator, or another piezoelectric actuator. Haptic output device 222 can be configured to provide a vibrotactile haptic effect in response to a haptic signal from the processor. The vibrotactile haptic effect can be utilized in conjunction with surface-based haptic effects and/or for other purposes. For example, each actuator may be used in conjunction to simulate a texture on the surface of display 202.

In some embodiments, either or both haptic output devices 218-1 and 218-2 can comprise an actuator other than a piezoelectric actuator. For example, haptic output devices 218-1 and 218-2 may comprise a piezoelectric actuator, an electromagnetic actuator, an electroactive polymer, a shape memory alloy, a flexible composite piezo actuator (e.g., an actuator comprising a flexible material), electrostatic, and/or magnetostrictive actuators, for example. Additionally, haptic output device 222 is shown, although multiple other haptic output devices can be coupled to the housing of device 201 and/or haptic output devices 222 may be coupled elsewhere. Device 201 may feature multiple haptic output devices 218-1/218-2 coupled to the touch surface at different locations, as well.

Illustrative Systems for Determining Haptic Effects for Multi-Touch Input

Figure 3:
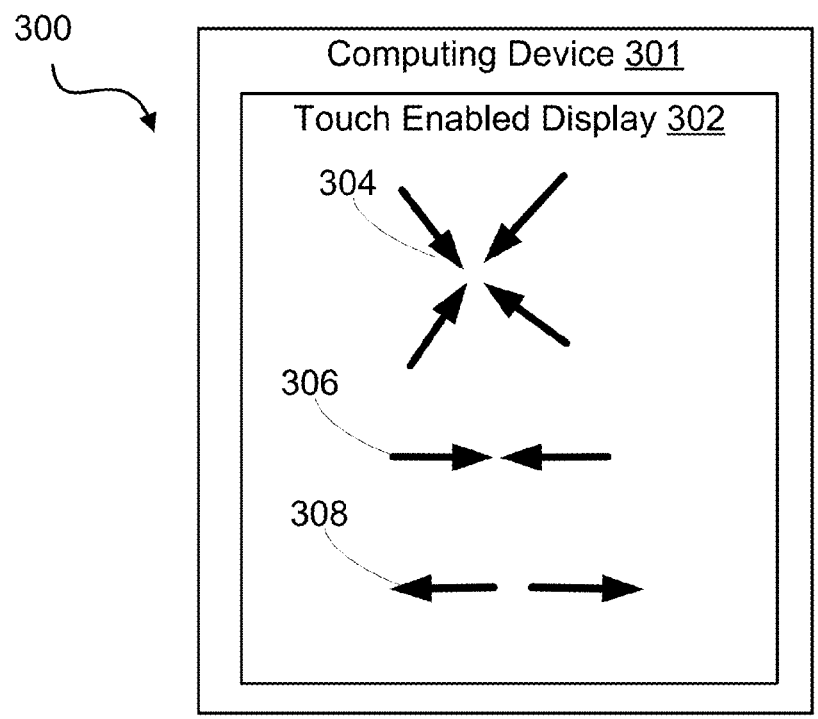
FIG. 3 depicts an illustrative system for determining haptic effects for multi-touch input.

Turning now to FIG. 3, system 300 is an illustrative example of determining haptic effects for multi-touch input. FIG. 3 is a diagram illustrating an external view of a system 300 comprising a computing device 301 that comprises a touch enabled display 302. In some embodiments, computing device 301 may comprise a multifunction controller. For example, a controller for use in a kiosk, ATM, automobile, airplane, thermostat, or other type of computing device. In other embodiments, computing device 301 may comprise a smartphone, tablet, or other type of computer. Further, in some embodiments, computing device 301 may comprise one or more virtual controllers on display 302.

As shown in FIG. 3, touch enabled display 302 is configured to detect a multi-touch. Thus, touch enabled display 302 is configured to detect more than one user interaction occurring at substantially the same time. These multi-touch interactions may control many different operations of computing device 301. For example, multi-touch interactions may enable the user to: zoom in, zoom out, change to different screens, pan through images, interact with specific interfaces (e.g., keyboards, buttons, sliders, or other interfaces), interact with gaming environments, or perform other multi-touch interactions enabled by software executing on computing device 301.

FIG. 3 comprises three examples of multi-touch interactions: four finger pinch 304, two finger pinch 306, and two finger reverse pinch 308. A user may make a four finger pinch 304 gesture by pinching four fingers together on the surface of touch enabled display 302. In some embodiments, a four finger pinch may cause computing device 301 to perform operations such as returning to a home screen. A user may make two finger pinch 306 by pinching together two fingers, e.g., a thumb and forefinger. In some embodiments, a two finger pinch may cause computing device 301 to perform operations such as zooming out from an image, web page, video, or other content. A user may make two finger reverse pinch 308 by pushing apart two fingers, e.g., a thumb and forefinger. In some embodiments, a two finger reverse pinch may cause computing device 301 to perform operations such as zooming in on an image, web page, video, or other content.

As described in further detail above and below, as the user makes a multi-touch gesture on the touch enabled display 302 computing device 301 determines one or more haptic effects. These haptic effects are based on factors associated with the multi-touch. Computing device 301 then outputs these haptic effects via one or more haptic output devices. These haptic effects may serve as confirmation of receipt of the gesture. Alternatively, the haptic effects may identify other information to the user, e.g., that the user's finger has passed a boundary, that a specific operation has started, that the display information has changed, or some other information associated with computing device 301.

Figure 4:
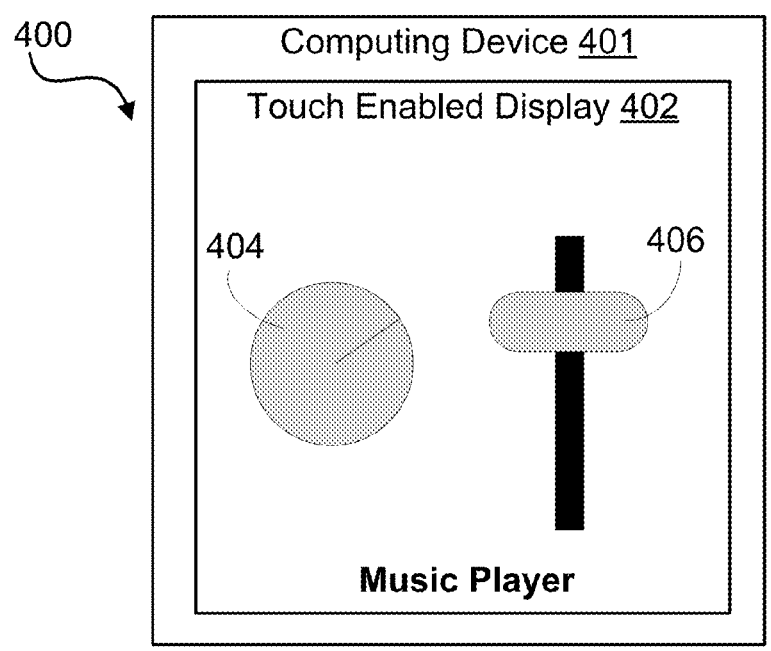
FIG. 4 depicts another illustrative system for determining haptic effects for multi-touch input.

Turning now to FIG. 4, system 400 is an illustrative example of determining haptic effects for multi-touch input. FIG. 4 is a diagram illustrating an external view of a system 400 comprising a computing device 401 that comprises a touch enabled display 402. As with computing device 301, described with regard to FIG. 3, in some embodiments, computing device 401 may comprise a multifunction controller. For example, a controller for use in a kiosk, ATM, automobile, airplane, thermostat, or other type of computing device. In other embodiments, computing device 401 may comprise a smartphone, tablet, or other type of computer. In one embodiment, computing device 401 may be configured to control a music player. In such an embodiment, computing device 401 may comprise one or more virtual controllers on display 402.

These controllers may be associated with functions of a music player, thus the user may interact with the controllers to control functions of the music player. For example, in the embodiment shown in FIG. 4, the computing device 401 comprises one or more widgets or virtual interfaces, shown in FIG. 4 as controller 404 and controller 406. In such an embodiment, controller 404 may comprise an image of a knob configured to control settings of the music player, e.g., a knob to tune to a radio station, select a new song, or adjust the volume. Similarly, controller 406 may comprise an image of a slider configured to adjust another feature of the music player. In other embodiments, computing device 401 may comprise a plurality of other virtual controllers on touch enabled display, each of the virtual controllers configured to control other aspects of a system, for example, a music player or other system.

In some embodiments, the computing device 401 may output a haptic effect to allow the user to identify the available functions without having to visually focus on touch enabled display 402. For example, the background of touch enabled display 402, knob 404, and slider 406 may each comprise a separate associated haptic effect. Computing device 401 may output this haptic effect to identify the location the user is touching, without the user having to visually focus on touch enabled display 402. The computing device 401 is further configured to determine a haptic effect based on a multi-touch gesture on touch enabled display 402 (e.g., when the user interacts with knob 404 and slider 406 at the same time).

The computing device 401 may determine haptic effects based on many characteristics of the multi-touch. For example, in one embodiment, the computing device 401 may determine the haptic effect based on the first icon the user touches. For example, knob 404 and slider 406 may each comprise a different associated haptic effect. Computing device 401 may output the haptic effect associated with the first icon touched by the user. Thus, if the computing device 401 determines that the user touched the knob 404 before slider 406, computing device 401 will output the haptic effect associated with knob 404.

In another embodiment, computing device 401 may determine a priority associated with each icon and output the haptic effect associated with the icon that has the highest priority. For example, in one embodiment, knob 404 may comprise a priority of 3 and slider 406 may comprise a priority of 2. Thus, computing device may output the haptic effect associated with slider 406 rather than the haptic effect associated with knob 404. In some embodiments, these priorities may be set by user preference. For example, the computing device 401 may comprise programming that allows the user to set a priority value for each icon. Further, in some embodiments the user may be able to assign specific haptic effects to each icon.

In still other embodiments, the computing device 401 may determine two separate haptic effects, but output only one of the two haptic effects. For example, in some embodiments the processor may determine the most intense haptic effect and output only that effect. Alternatively, in some embodiments the processor may output the haptic effect comprising the highest associated priority. For example, each haptic effect may comprise its own priority. In such an embodiment, these priorities may have been assigned by the designer or based on user preferences.

In still other embodiments, the computing device 401 may determine a third haptic effect based on the two haptic effects and output the third haptic effect. For example, in some embodiments the third haptic effect may comprise an average of the two haptic effects. Further, in some embodiments, the haptic effect may comprise a superposition of the two effects. This superposition may comprise a weighted combination or weighted average of the two effects. For example, the computing device 401 may assign a weight to each haptic effect (e.g., weights of 2, 1, 0.5, 0.25, or 0). The computing device 401 may then determine a third haptic effect that is the combination of the two weighted haptic effects or the average of the two weighted effects.

Further, in some embodiments touch enabled display 402 may receive a third, fourth fifth, or more user interaction, e.g., a multi-touch with many additional contacts. Computing device 401 may be configured to determine haptic effects associated with each of these multi-touches, e.g., based on the first interactions of the multi-touch, the interaction with the highest priority, or determine effects based on a combination of the effect associated with each interaction.

In some embodiments, computing device 401 may comprise a plurality of haptic output devices, e.g., a vibrating actuator and an ESF actuator. In such an embodiment, computing device 401 may be configured to determine the haptic effect based in part on the haptic output devices. For example, in one embodiment, each haptic output device may comprise an associated priority. For example, in some embodiments, haptic effects output by the ESF actuator may comprise a higher priority than other haptic effects. In other embodiments, computing device 401 may consider additional characteristics. For example, in some embodiments, ESF based haptic effects are detectable only when the user is in motion (e.g., moving over the actuated surface). In such an embodiment, computing device 401 may determine that haptic effects to be output by the ESF actuator have a low priority, or should not be output, if the user interaction is not moving on a surface or the movement is below a certain threshold.

Further, in some embodiments the computing device may determine the haptic effect based on the haptic output device and the location of contact. For example, in some embodiments the computing device may comprise a housing with shape deformation functionality and an ESF actuator. In such an embodiment, the computing device may determine a haptic effect configured to deform the housing only if the user is in contact with the housing. Similarly, the computing device may determine an ESF based haptic effect only if the user is interacting with a touch surface coupled to the ESF actuator. In other embodiments, the computing device may assign higher or lower priorities to haptic effects and haptic output devices based on similar determinations.

Figure 5:
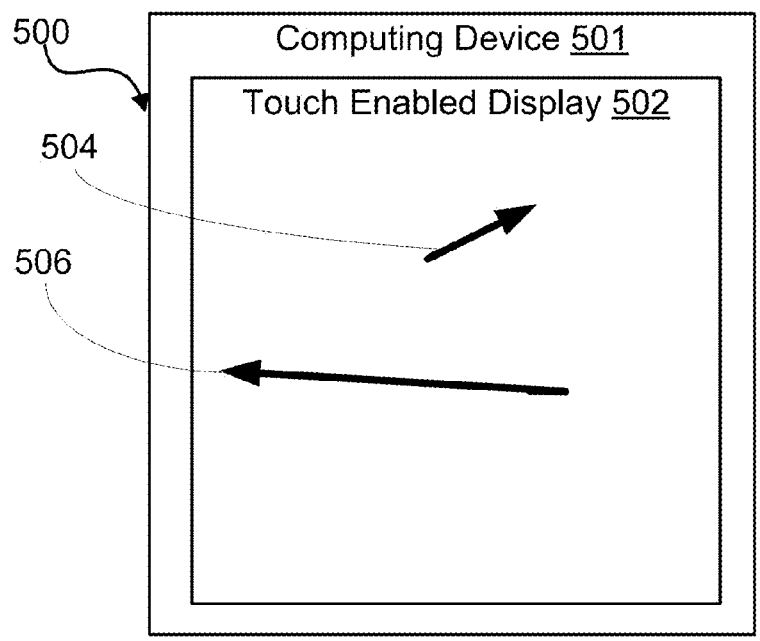
FIG. 5 depicts an illustrative system for determining haptic effects for multi-touch input.

Turning now to FIG. 5, system 500 is an illustrative example of determining haptic effects for multi-touch input. FIG. 5 is a diagram illustrating an external view of a system 500 comprising a computing device 501 that comprises a touch enabled display 502. As with computing device 301, described with regard to FIG. 3, in some embodiments, computing device 501 may comprise a multifunction controller configured to control a plurality of different types of devices or a mobile device such as a tablet, smartphone, or other handheld device.

As described above, touch enabled display 502 is configured to detect a multi-touch. Further, computing device 501 is configured to determine a haptic effect based in part on the multi-touch. FIG. 5 shows two user interactions 504 and 506 on the surface of touch enabled display 502. As shown in FIG. 5, user interaction 504 is a relatively inactive user interaction, e.g., an interaction with relatively little movement (shown as a short line). Further, user interaction 506 is a relatively active user interaction, e.g., an interaction with a relatively large amount of user movement (shown as a longer line).

In the embodiment shown in FIG. 5, computing device 501 may determine the haptic effect based on the more active user interaction 506. Thus, computing device 501 may determine the haptic effect based on this specific interaction, e.g., the location of touch enabled display 502 associated with this interaction or other information associated with interaction 506.

In some embodiments haptic effects generated using Electrostatic Friction (ESF) may be felt only when in motion, e.g., when the finger is moving across the touch surface. Thus, in some embodiments, ESF based haptic effects may be output only when the user is moving. Alternatively, in some embodiments, ESF effects may be assigned a high priority if the user is currently moving and a low priority if the user is not moving.

Figure 6:
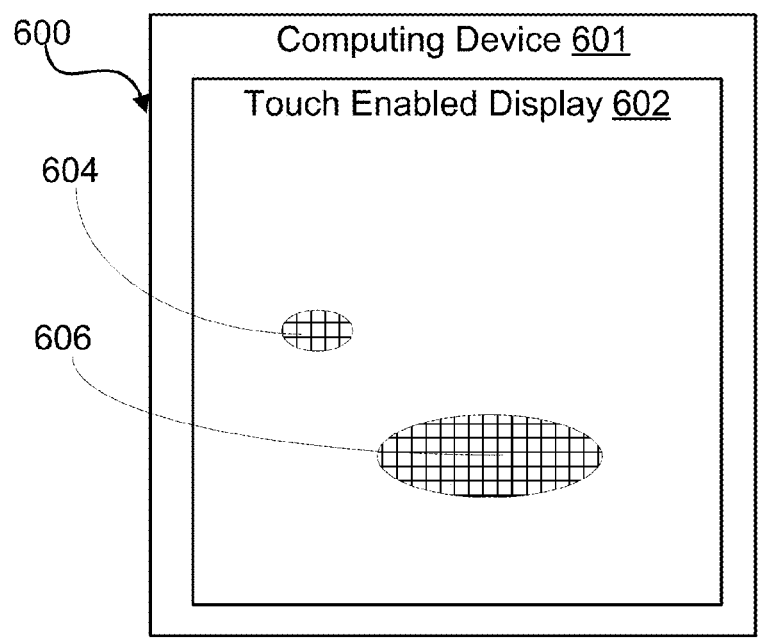
FIG. 6 depicts another illustrative system for determining haptic effects for multi-touch input.

Turning now to FIG. 6, system 600 is an illustrative example of determining haptic effects for multi-touch input. FIG. 6 is a diagram illustrating an external view of a system 600 comprising a computing device 601 that comprises a touch enabled display 602. As with computing device 301, described with regard to FIG. 3, in some embodiments, computing device 601 may comprise a multifunction controller configured to control a plurality of different types of devices or a mobile device such as a tablet, smartphone, or other handheld device.

As described above, touch enabled display 602 is configured to detect a multi-touch. Further, computing device 601 is configured to determine a haptic effect based in part on the multi-touch. FIG. 6 shows two user interactions 604 and 606 on the surface of touch enabled display 602. As shown in FIG. 6, user interaction 604 is a relatively low pressure user interaction, e.g., an interaction wherein the user has a relatively soft touch on the surface of touch enabled display 602 (shown as a smaller ellipse). Further, user interaction 606 is a relatively high pressure user interaction, e.g., an interaction wherein the user applies a relatively large amount of pressure to the surface of touch enabled display 602 (shown as a larger ellipse).

In the embodiment shown in FIG. 6, computing device 601 may determine the haptic effect based on the higher pressure user interaction 606. Thus, computing device 601 may determine the haptic effect based on this specific interaction, e.g., the location of touch enabled display 602 associated with this interaction or other information associated with interaction 606.

In some embodiments, the processor may determine that the user interaction is associated with two different users (e.g., a first user and a second user). In such an embodiment the processor may determine a haptic effect associated with just one of the user interactions (e.g., an effect associated with only the first user). In another embodiment, the processor may determine a haptic effect associated with both user interactions (e.g., a haptic effect associated with the interactions of both the first user and the second user). In some embodiments, the device may comprise two or more haptic output devices and the processor may assign one haptic output device to one user and another haptic output device to another user (e.g., interaction from user 1 will be associated with effects from an ESF actuator and interaction from user 2 will be associated with effects from a vibrating actuator). In still another embodiment, the processor may determine that in such an embodiment no haptic effect should be output.

In some embodiments, the processor may determine the haptic effect based in part on how the user will feel the effect. For example, in some embodiments the computing device may comprise only a vibrating actuator. In such an embodiment, the processor may determine a haptic effect associated with user interaction with the housing (e.g., gripping the housing) has a higher priority than user interaction with a touch surface because the haptic effect will be more strongly felt through the hand holding the device. Similarly, a computing device that comprises only an ESF actuator may assign a higher priority to user interaction with a touch surface because the haptic effect will be perceived through interaction with the touch surface.

In still other embodiments, the device may comprise a plurality of haptic output devices. In such an embodiment, the processor may be configured to determine haptic effects to be output by each of the plurality of haptic output devices simultaneously. For example, the processor may determine a haptic effect associated with each user interaction and each haptic output device. The processor may weight these effects and interactions as discussed herein. The processor may then cause each haptic output device to output the determined haptic effect. Thus, the haptic effect associated with the multitouch may comprise a composite effect generated by multiple haptic output devices.

Illustrative Methods for Determining Haptic Effects for Multi-Touch Input

Figure 7:
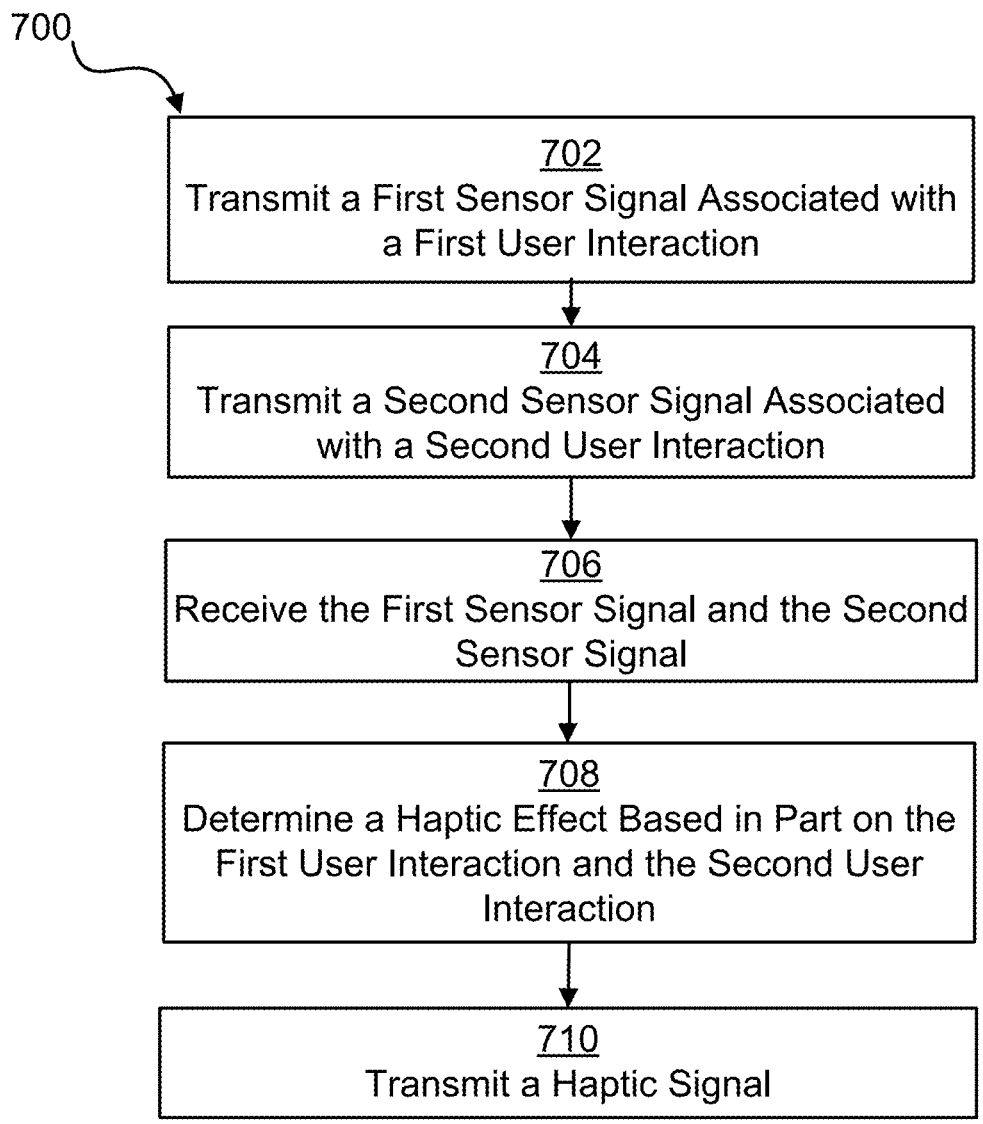
FIG. 7 is flow chart of steps for performing a method for determining haptic effects for multi-touch input.

FIG. 7 is a flowchart showing an illustrative method 700 for determining haptic effects for multi-touch input. In some embodiments, the steps in FIG. 7 may be implemented in program code that is executed by a processor, for example, the processor in a general purpose computer, a mobile device, or a server. In some embodiments, these steps may be implemented by a group of processors. The steps below are described with reference to components described above with regard to system 100 shown in FIG. 1.

The method 700 begins at step 702 when a sensor 108 transmits a first sensor signal associated with a first user interaction. Sensor 108 may comprise one or more of a plurality of sensors known in the art, for example, resistive and/or capacitive sensors may be embedded in touch surface 116 and used by processor 102 to determine the location of a touch and other information, such as pressure. As another example, optical sensors with a view of the touch surface may be used to determine the touch position. In still other embodiments, sensors 108 and touch surface 116 may comprise a touch screen display. Further, upon detecting a first interaction, sensors 108 may send a signal associated with that interaction to processor 102. In some embodiments, the sensor signal may comprise the location of the user interaction. For example a location on the surface of a touch surface 116. Furthermore, in some embodiments, this location may be associated with a virtual interface or "widget" of the type described above. Similarly, in some embodiments, the sensor signal may comprise data associated with the time of contact, speed, pressure, or force of the user interaction. For example, the sensor signal may indicate how fast the user's finger is moving, or whether the user is pressing with force onto touch surface 116.

Next, sensor 108 transmits a second sensor signal associated with a second user interaction 704. In some embodiments the first user interaction and the second user interaction may occur at substantially the same time. Sensor 108 may comprise one or more of a plurality of sensors known in the art, for example, resistive and/or capacitive sensors may be embedded in touch surface 116 and used to determine the location of a touch and other information, such as pressure. As another example, optical sensors with a view of the touch surface may be used to determine the touch position. In still other embodiments, sensors 108 and touch surface 116 may comprise a touch screen display. Further, upon detecting a first interaction, sensors 108 may send a signal associated with that interaction to processor 102. In some embodiments, the sensor signal may comprise the location of the user interaction. For example a location on the surface of a touch surface 116. Furthermore, in some embodiments, this location may be associated with a virtual interface or "widget" of the type described above. Similarly, in some embodiments, the sensor signal may comprise data associated with the time of contact, speed, pressure, or force of the user interaction. For example, the sensor signal may indicate how fast the user's finger is moving, or whether the user is pressing with force onto touch surface 116.

Next the processor 102 receives the first and second sensor signals 706. As described above, the processor may receive the sensor signals from a single sensor 108 or a plurality of different sensors configured to measure different types of user interaction (e.g., movement sensors, inclination sensors, touch sensors, buttons, sliders, or other types of sensors).

The method continues when processor 102 determines a haptic effect based in part on the first user interaction and the second user interaction 708. The processor may rely on programming contained in haptic effect determination module 126 to select or determine the haptic effect. For example, the processor 102 may access drive signals stored in memory 104 and associated with particular haptic effects. As another example, the processor 102 may generate a signal by accessing a stored algorithm and inputting parameters associated with an effect. For example, an algorithm may output data for use in generating a drive signal based on amplitude and frequency parameters. As another example, a haptic signal may comprise data sent to haptic output device 118 to be decoded by haptic output device 118. For instance, the haptic output device 118 may itself respond to commands specifying parameters such as amplitude and frequency.

In some embodiments, the haptic effect may be one of a plurality of available textures. For example, the plurality of textures may comprise one or more of the textures of: water, grass, ice, metal, sand, gravel, brick, fur, leather, skin, fabric, rubber, leaves, or any other available texture, for example, a texture associated with explosions or fire. In some embodiments, the texture may be associated with a feature of a user interface, such as a widget displayed to the user. For example, in one embodiment, a specific texture may be associated with a virtual dial, for example, the texture of sand. Further, in such an embodiment, as the user interacts with the virtual dial, for example, by modifying the angular rotation of the virtual dial, the processor 102 may output a different texture. For example, as the user turns the virtual dial, the haptic effect may be configured to simulate a change in the coarseness of the sand. Thus, as the user turns the virtual dial in one direction, the user may feel a haptic effect that simulates gravel, and as the user turns the virtual dial the other direction the user may feel a haptic effect that simulates the feeling of a powder. In still other embodiments the haptic effect may comprise a vibration or a surface based effect configured to vary the friction the user perceives when interacting with the surface of a touch enabled display or other touch surface.

Figure 8:
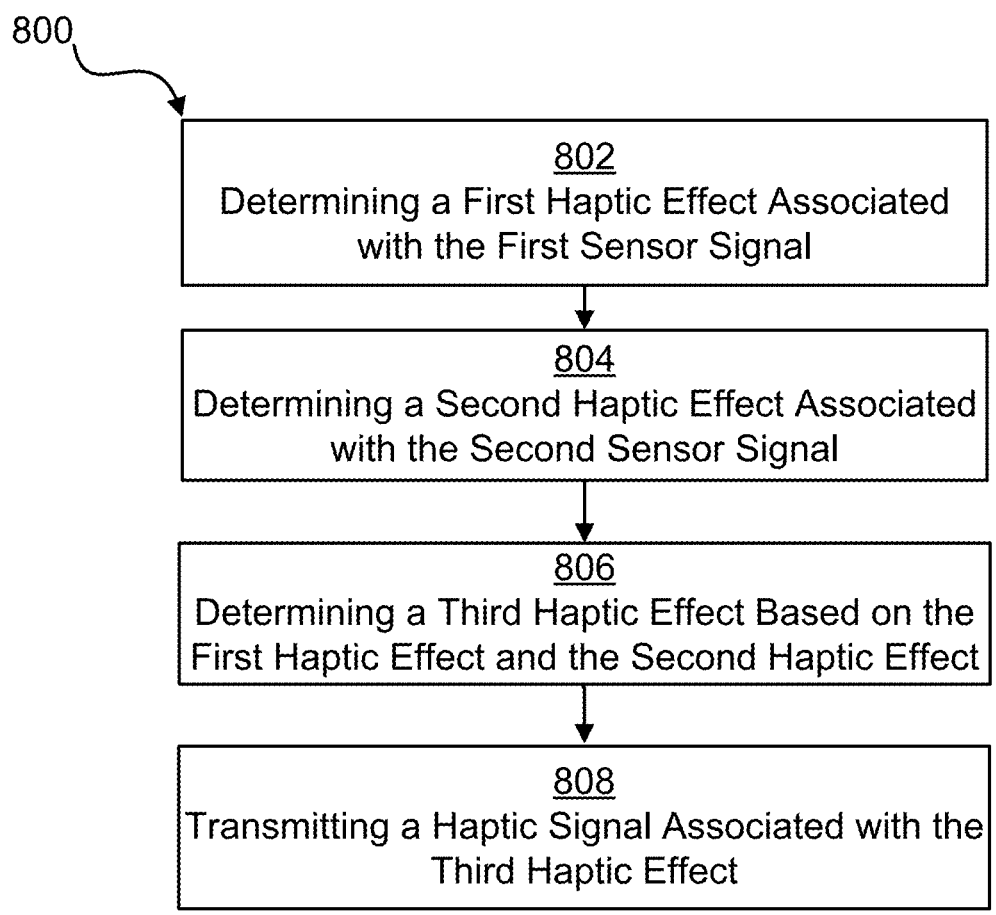
FIG. 8 is another flow chart of steps for performing a method for determining haptic effects for multi-touch input.

In some embodiments the processor may determine the haptic effect based on the operations described with regard to FIG. 8 and flow chart 800. In some embodiments, the processor 102 may determine the effect based on multiple factors associated with the multi-touch. For example, in some embodiments the multi-touch may be associated with features in a graphical user interface (e.g., buttons, keys, or graphical widgets in the user interface). In such an embodiment, the processor may determine the haptic effect based in part on these features. For example, in one embodiment, a finger may touch one virtual feature (e.g., a button) while the other finger touches another virtual feature (e.g., a background area). In such an embodiment, the processor may determine the haptic effect based in part on these features. For example, the processor 102 may determine that the button overrides the background, and thus output a haptic effect associated with the button.

Alternatively, the processor 102 may determine that a specific haptic effect has a higher priority than another haptic effect, and thus output only the high priority effect. For example, the processor 102 may determine that a haptic effect configured to simulate the edge of an object in the graphical user interface has a higher priority than other effects, and thus output only the edge effect. Alternatively, the processor 102 may determine that only the most intense effect should be output. Thus, in some embodiments, the processor may determine a low intensity vibration and a high intensity vibration, but output only the high intensity vibration.

Further, in some embodiments, the processor 102 may determine the haptic effect based on information associated with the multi-touch. For example, the processor 102 may determine the haptic effect based on the user interaction that occurred first. Further, as discussed above, in some embodiments, the processor may determine the haptic effect based on the most active user interaction (the interaction with the most movement), least active user interaction, or the user interaction applying the most pressure.

Then, at step 710, the processor 102 transmits a haptic signal associated with the haptic effect to haptic output device 118, which outputs the haptic effect. In some embodiments, processor 102 outputs a haptic signal configured to cause haptic output device 118 to generate the haptic effect. In some embodiments haptic output device 118 may comprise traditional actuators such as piezoelectric actuators or electric motors coupled to touch surface 116 or other components within computing device 101. In other embodiments haptic output device 118 may comprise one or more electrostatic actuators configured to simulate textures or vary the perceived coefficient of friction on touch surface 116 using electrostatic fields.

In some embodiments sensor 108 may detect a third, fourth fifth, or more user interaction, e.g., a multi-touch with many additional contacts. Processor 102 may comprise programming to determine haptic effects based in part on each of these components of a multi-touch interaction. For example, processor 102 may determine the priority of each touch regardless of the number of touches or the first interaction regardless of the number of other interactions associated with the multi-touch. Further, in some embodiments, processor 102 may determine a haptic effect associated with each interaction and then output a different haptic effect based in part on each of these effects.

Turning now to FIG. 8, FIG. 8 is a flowchart showing an illustrative method 800 for determining haptic effects for multi-touch input. In some embodiments, the steps in FIG. 8 may be implemented in program code that is executed by a processor, for example, the processor in a general purpose computer, a mobile device, or a server. In some embodiments, these steps may be implemented by a group of processors. The steps below are described with reference to components described above with regard to system 100 shown in FIG. 1.

The method 800 begins when processor 102 determines a first haptic effect based in part on the first sensor signal 802. The first sensor signal comprises data associated with the first user interaction. The processor 102 may rely on programming contained in haptic effect determination module 126 to select or determine the haptic effect. For example, the processor 102 may access drive signals stored in memory 104 and associated with particular haptic effects. As another example, a signal may be generated by accessing a stored algorithm and inputting parameters associated with an effect. For example, an algorithm may output data for use in generating a drive signal based on amplitude and frequency parameters. As another example, a haptic signal may comprise data sent to an actuator to be decoded by the actuator. For instance, the actuator may itself respond to commands specifying parameters such as amplitude and frequency.

In some embodiments, the haptic effect may be one of a plurality of available textures. For example, the plurality of textures may comprise one or more of the textures of water, grass, ice, metal, sand, gravel, brick, fur, leather, skin, fabric, rubber, leaves, or any other available texture, for example, a texture associated with explosions or fire. In some embodiments, the texture may be associated with a feature of a user interface, such as a widget displayed to the user. For example, in one embodiment, a specific texture may be associated with a virtual dial, for example, the texture of sand. Further, in such an embodiment, as the user interacts with the virtual dial, for example, by modifying the angular rotation of the virtual dial, the processor 102 may output a different texture. For example, as the user turns the virtual dial, the haptic effect may be configured to simulate a change in the coarseness of the sand. Thus, as the user turns the virtual dial in one direction, the user may feel a haptic effect that simulates gravel, and as the user turns the virtual dial the other direction the user may feel a haptic effect that simulates the feeling of a powder. In other embodiments the haptic effect may comprise a vibration or a surface based effect configured to vary the friction the user perceives when interacting with the surface of a touch enabled display or other touch surface.

Next the processor 102 determines a second haptic effect based in part on the second sensor signal 804. The second sensor signal comprises data associated with the second user interaction. The processor 102 may rely on programming contained in haptic effect determination module 126 to select or determine the haptic effect. For example, the processor 102 may access drive signals stored in memory 104 and associated with particular haptic effects. As another example, a signal may be generated by accessing a stored algorithm and inputting parameters associated with an effect. For example, an algorithm may output data for use in generating a drive signal based on amplitude and frequency parameters. As another example, a haptic signal may comprise data sent to an actuator to be decoded by the actuator. For instance, the actuator may itself respond to commands specifying parameters such as amplitude and frequency.

In some embodiments, the haptic effect may be one of a plurality of available textures. For example, the plurality of textures may comprise one or more of the textures of: water, grass, ice, metal, sand, gravel, brick, fur, leather, skin, fabric, rubber, leaves, or any other available texture, for example, a texture associated with explosions or fire. In some embodiments, the texture may be associated with a feature of a user interface, such as a widget displayed to the user. For example, in one embodiment, a specific texture may be associated with a virtual dial, for example, the texture of sand. Further, in such an embodiment, as the user interacts with the virtual dial, for example, by modifying the angular rotation of the virtual dial, the processor 102 may output a different texture. For example, as the user turns the virtual dial, the haptic effect may be configured to simulate a change in the coarseness of the sand. Thus, as the user turns the virtual dial in one direction, the user may feel a haptic effect that simulates gravel, and as the user turns the virtual dial the other direction the user may feel a haptic effect that simulates the feeling of a powder. In other embodiments the haptic effect may comprise a vibration or a surface based effect configured to vary the friction the user perceives when interacting with the surface of a touch enabled display or other touch surface.

Then the processor 102 determines a third haptic effect based in part on the first haptic effect and the second haptic effect 806. For example, in some embodiments the processor 102 may determine the most intense haptic effect and output the third haptic effect as only the most intense haptic effect. Alternatively, in some embodiments the processor 102 may output the haptic effect comprising the highest associated priority. For example, each haptic effect may comprise its own priority. In such an embodiment, these priorities may have been assigned by the designer or based on user preferences.

In other embodiments, the processor 102 may determine an average of the two haptic effects. The processor 102 may then output the third haptic effect as this average. Further, in some embodiments, the processor 102 may determine a superposition of the two haptic effects. This superposition may comprise a weighted combination or weighted average of the two effects. For example, processor 102 may assign a weight to each haptic effect (e.g., weights of 2, 1, 0.5, 0.25, or 0). The processor 102 may then determine a third haptic effect that is the combination of the two weighted haptic effects or the average of the two weighted effects. In some embodiments, these weights may be determined based in part on, e.g., the user interaction (e.g., the speed of user interaction, the pressure of user interaction, or the activity of the user interaction), the haptic output device associated with the haptic effect, the location associated with the user interaction, the user from which the interaction originated (e.g., if there are two or more users interacting with the device), or user defined characteristics associated with the haptic effect.

Further, in some embodiments touch surface 116 may receive a third, fourth fifth, or more user interaction, e.g., a multi-touch with many additional contacts. Processor 102 may be configured to determine haptic effects associated with each of these multi-touches and output a signal haptic effect based on each of these haptic effects as described above.

Then, at step 808, the processor 102 transmits a haptic signal associated with the third haptic effect to haptic output device 118, which outputs the haptic effect. In some embodiments, processor 102 outputs a haptic signal configured to cause haptic output device 118 to generate the haptic effect. In some embodiments haptic output device 118 may comprise traditional actuators such as piezoelectric actuators or electric motors coupled to touch surface 116 or other components within computing device 101. In other embodiments haptic output device 118 may comprise one or more electrostatic actuators configured to simulate textures or vary the perceived coefficient of friction on touch surface 116 using electrostatic fields.

Advantages of Determining Haptic Effects for Multi-Touch Input

There are numerous advantages of determining haptic effects for multi-touch input. Currently most existing haptic rendering algorithms are single input, single output. Embodiments of the present disclosure enable these rendering algorithms to be used in a multi-touch environment. This may reduce the need for costly redevelopment of rendering algorithms.

Further, embodiments of the present disclosure enable devices that may comprise only one haptic output device to still output haptic effects associated with multiple user inputs. This enables these devices to output more useful and intuitive haptic effects associated with multi-touch.

Further, in some embodiments, determining haptic effects for multi-touch input may enable a user to use software and user interfaces more effectively. For example, a user may be able to make determinations regarding available operations in a program without having to visually focus on a display. This may increase overall user satisfaction.

GENERAL CONSIDERATIONS

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations.

Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process that is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Embodiments in accordance with aspects of the present subject matter can be implemented in digital electronic circuitry, in computer hardware, firmware, software, or in combinations of the preceding. In one embodiment, a computer may comprise a processor or processors. The processor comprises or has access to a computer-readable medium, such as a random access memory (RAM) coupled to the processor. The processor executes computer-executable program instructions stored in memory, such as executing one or more computer programs including a sensor sampling routine, selection routines, and other routines to perform the methods described above.

Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example tangible computer-readable media, that may store instructions that, when executed by the processor, can cause the processor to perform the steps described herein as carried out, or assisted, by a processor. Embodiments of computer-readable media may comprise, but are not limited to, all electronic, optical, magnetic, or other storage devices capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other devices may include computer-readable media, such as a router, private or public network, or other transmission device. The processor, and the processing, described may be in one or more structures, and may be dispersed through one or more structures. The processor may comprise code for carrying out one or more of the methods (or parts of methods) described herein.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed:

1. A system comprising:
   a touch-sensitive input device configured to detect a first user interaction and a second user interaction, wherein at least part of the first user interaction occurs at the same time as the second user interaction;
   a processor in communication with the touch-sensitive input device, and configured to:
     determine a haptic effect based in part on an earlier of the first user interaction or the second user interaction, wherein the first user interaction is different from the second user interaction; and
     transmit a haptic signal associated with the haptic effect; and
   a haptic output device configured to receive the haptic signal and output the haptic effect.

2. The system of claim 1, wherein determining the haptic effect further comprises:
   determining a first haptic effect associated with the first user interaction and determining a second haptic effect associated with the second user interaction.

3. The system of claim 2, further comprising: determining which of the first haptic effect and the second haptic effect has higher intensity, which of the first haptic effect and the second haptic effect is highest priority, or an average of the first and second haptic effects.

4. The system of claim 2, further comprising superpositioning the first haptic effect and the second haptic effect by applying a first weight to the first haptic effect and a second weight to the second haptic effect and combining the two weighted haptic effects.

5. The system of claim 4, wherein the haptic effect comprises an average of the combination of the two weighted haptic effects.

6. The system of claim 1, wherein determining the haptic effect further comprises:
   determining a most active user interaction by determining which of the first user interaction and the second user interaction comprises more user movement; and
   determining the haptic effect based on the most active user interaction.

7. The system of claim 1, wherein determining the haptic effect further comprises:
   determining a highest pressure user interaction by determining which of the first user interaction and the second user interaction comprises a higher pressure; and
   determining the haptic effect based on the highest pressure user interaction.

8. The system of claim 1, wherein determining the haptic effect is based in part on a user preference.

9. The system of claim 1, wherein the touch-sensitive input device is further configured to detect a third user interaction, and wherein the processor is further configured to determine the haptic effect based in part on the third user interaction.

10. A method comprising:
    detecting a first user interaction;
    detecting a second user interaction, wherein at least part of the first user interaction occurs at the same time as the second user interaction;
    determining a haptic effect based in part on an earlier of the first user interaction or the second user interaction, wherein the first user interaction is different from the second user interaction; and
    transmitting a haptic signal associated with the haptic effect to a haptic output device configured to receive the haptic signal and output the haptic effect.

11. The method of claim 10, wherein determining the haptic effect comprises:
    determining a first haptic effect associated with the first user interaction and determining a second haptic effect associated with the second user interaction.

12. The method of claim 11, further comprising: determining which of the first haptic effect and the second haptic effect has higher intensity, which of the first haptic effect and the second haptic effect is highest priority, or an average of the first and second haptic effects.

13. The method of claim 11, further comprising superpositioning the first haptic effect and the second haptic effect by applying a first weight to the first haptic effect and a second weight to the second haptic effect and combining the two weighted haptic effects.

14. The method of claim 13, wherein the haptic effect comprises an average of the combination of the two weighted haptic effects.

15. The method of claim 10, wherein determining the haptic effect further comprises:
    determining a most active user interaction by determining which of the first user interaction and the second user interaction comprises more user movement; and
    determining the haptic effect based on the most active user interaction.

16. The method of claim 10, wherein determining the haptic effect further comprises:
    determining a highest pressure user interaction by determining which of the first user interaction and the second user interaction comprises a higher pressure; and
    determining the haptic effect based on the highest pressure user interaction.

17. The method of claim 10, wherein determining the haptic effect is based in part on a user preference.

18. The method of claim 10, further comprising:
    transmitting a third sensor signal associated with a third user interaction; and
    determining the haptic effect based in part on the third user interaction.

19. A non-transitory computer readable medium comprising program code, which when executed by a processor is configured to cause the processor to:
    detect a first user interaction;
    detect a second user interaction, wherein at least part of the first user interaction occurs at the same time as the second user interaction;
    determine a haptic effect based in part on an earlier of the first user interaction or the second user interaction, wherein the first user interaction is different from the second user interaction; and
    transmit a haptic signal associated with the haptic effect to a haptic output device configured to receive the haptic signal and output the haptic effect.

20. The non-transitory computer readable medium of claim 19, further comprising program code, which when executed by the processor is configured to cause the processor to:
    detect a third user interaction; and
    determine the haptic effect based in part on the third user interaction.

* * * * *